Oct. 7, 1952  P. G. BURCH  2,612,687
FRUIT-CORING UTENSIL
Filed Aug. 19, 1949

INVENTOR.
PAUL G. BURCH
BY
McMorrow, Berman + Davidson
ATTORNEYS

Patented Oct. 7, 1952

2,612,687

UNITED STATES PATENT OFFICE 2,612,687

FRUIT-CORING UTENSIL

Paul G. Burch, Sheffield, Ala.

Application August 19, 1949, Serial No. 111,204

1 Claim. (Cl. 30—346)

This invention relates to coring devices for removing cores from fruit, vegetables, and the like, and more particularly to a coring knife for removing fruit cores.

A main object of the invention is to provide a novel and improved coring knife which is very simple in construction, which is easy to operate, and which enables the operator to remove core material and seeds from the interior of fruit, such as apples, pears and the like in a very short period of time.

A further object of the invention is to provide an improved fruit-coring knife which is very inexpensive to manufacture, which is sturdy in construction, and which is easy to sharpen.

Further objects and advantages of the invention will become apparent from the following description and claim, and from the accompanying drawings, wherein:

Figure 1:
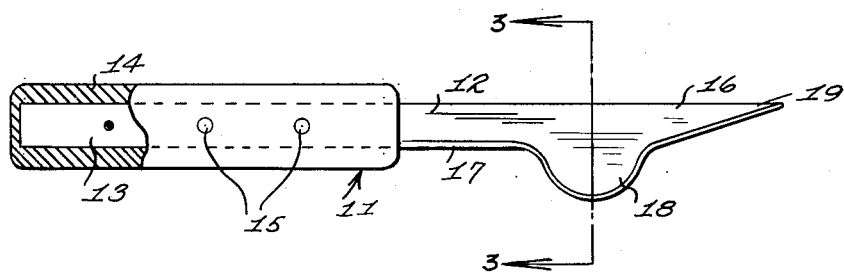
Figure 1 is a side elevational view, partly in cross-section, of a fruit-coring knife constructed in accordance with the present invention.
Figure 2:
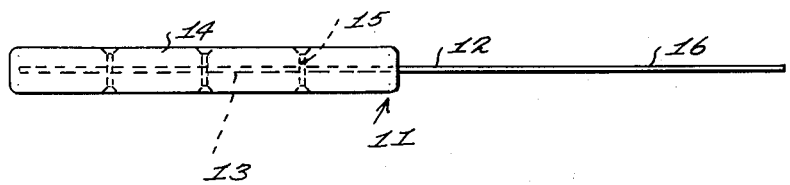
Figure 2 is a top plan view of the fruit-coring knife of Figure 1.
Figure 3:
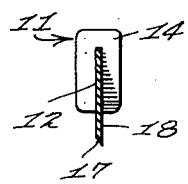
Figure 3 is a cross-sectional view taken on line 3—3 of Figure 1.

Referring to the drawings, the fruit-coring knife is designated generally at 11. The knife comprises a flat blade 12 having a straight shank portion 13 which is received in a handle 14 and secured thereto, as by rivets 15. The blade 12 has a straight edge 16 on one side thereof, the edge 16 being relatively dull, and the opposite edge of the blade, shown at 17, being beveled and ground to define a sharp cutting edge. The sharp edge 17 is parallel to the blunt edge 16 for a substantial distance from handle 14, and then is formed with a substantially semi-circular, outwardly-extending portion 18. Beyond the semi-circular portion 18 the sharp edge 17 tapers toward the end of the blade to define a sharp point 19.

In removing the core from fruit, such as from an apple, pear, or the like, the blade 12 is inserted in the fruit, with the straight edge 16 extending axially through the fruit and the semi-circular portion 18 extending adjacent the seed sac thereof. The blade is inserted and removed several times at different angular positions around the axis of the fruit to loosen portions of the core and to cut through the fibers holding the core with respect to the remainder of the fruit. After several such operations, the blade is inserted, again with the straight edge 16 extending axially through the fruit, and with the semi-circular portion 18 located in the region of the core, and the blade is then rotated around the axis defined by edge 16, whereby the portions of the core are swept around said axis and are severed from the body of the fruit. The blade is revolved several times in order to completely loosen the seed sac and core fragments. The blade is then withdrawn and the loosened core fragments are shaken out of the fruit through the axial passage formed by the blade during the previous rotations thereof. The cored fruit is then ready for use, either in cooking or for raw consumption.

While a specific embodiment of a coring knife has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A knife for coring fruit, such as apples and pears, comprising an elongated flat blade having one substantially straight edge, one end portion of said blade constituting a shank having substantially parallel edges, a handle receiving and secured to said shank, and an extension projecting from the other edge of said blade at a location spaced from said handle and having a substantially semicircular edge, the portion of said other edge between said handle and said projection being substantially parallel to said one edge and the portion of said other edge at the side of said projection remote from said handle being inclined to meet said one edge at the end of said blade remote from said handle, the semicircular edge of said projection being disposed in a common plane with said other edge of said blade and said other edge of the blade and semi-circular edge of said projection being beveled to a sharp condition.

PAUL G. BURCH.

REFERENCES CITED

The following references are of record in the file of this patent:

UNITED STATES PATENTS

| Number | Name | Date |
|---|---|---|
| 1,095,706 | Chapman | May 5, 1914 |
| 1,270,040 | Miller | June 18, 1918 |